United States Patent [19]
Baker et al.

[11] Patent Number: 5,455,848
[45] Date of Patent: Oct. 3, 1995

[54] MALFUNCTION DETECTION SYSTEM FOR INTERMITTENT EVENTS

[75] Inventors: Andrew D. Baker, Brockton; James B. Finnerty, Groton, both of Mass.

[73] Assignee: Data Instruments, Inc., Acton, Mass.

[21] Appl. No.: 973,059

[22] Filed: Nov. 6, 1992

[51] Int. Cl.⁶ .................................................. G06M 3/00
[52] U.S. Cl. ................................ 377/2; 377/15; 377/16
[58] Field of Search .............................. 377/6, 7, 8, 15, 377/16, 30, 2

[56] References Cited

U.S. PATENT DOCUMENTS

| | | | |
|---|---|---|---|
| 3,670,147 | 6/1972 | Wright | 377/15 |
| 3,911,254 | 10/1975 | Leibrecht et al. | 377/8 |
| 4,105,914 | 8/1978 | Murata et al. | 377/8 |
| 4,485,442 | 11/1984 | Snaper et al. | 377/15 |
| 4,532,421 | 7/1985 | Sasaoka et al. | 377/8 |

Primary Examiner—Timothy P. Callahan
Assistant Examiner—My Trang Nu Ton
Attorney, Agent, or Firm—Pandiscio & Pandiscio

[57] ABSTRACT

A malfunction detection system for monitoring the occurrence of intermittent events during the operation of an industrial machine of the type comprising a machine controller and characterized by repetitive machine cycles and for directing the machine controller to stop the industrial machine in the absence of the occurrence of one of the intermittent events within a preselected number of machine cycles following the next preceding one of said intermittent events.

7 Claims, 2 Drawing Sheets

MALFUNCTION DETECTION SYSTEM FOR INTERMITTENT EVENTS

FIELD OF THE INVENTION

This invention relates to automatic machine control devices in general, and more particularly to malfunction detection systems for use with such devices.

BACKGROUND OF THE INVENTION

Many industrial machines are designated to automatically perform the same task over and over again. Such machines generally include some sort of control system to regulate automatic operation of the machine and, in many cases, also include some sort of malfunction detection system to determine when a malfunction has occurred so that the industrial machine should be shut down.

More particularly, such malfunction detection systems typically comprise a plurality of sensors adapted to monitor various aspects of the machine's operation, and signalling means for instructing the industrial machine's control system to shut down the machine when a malfunction is detected. Some sensors are adapted to monitor so-called "cyclic" events in the machine's operation; other sensors are adapted to monitor so-called "non-cyclic" events.

Cyclic events are those events which must occur once in each cycle of the industrial machine's operation. For example, in the case of a power press, examples of cyclic events might be stock feed (i.e., the proper insertion of virgin stock into the press) and parts ejection (i.e., the proper ejection of formed parts from the press). Such events are expected to occur at a preselected time during each cycle of the press (i.e., during a so-called "ready window") and to last for a known duration, and can be monitored by a variety of cyclic sensors which watch for the occurrence of the expected event during the ready window. So long as the sensors successfully detect the occurrence of the expected event during the ready window, the industrial machine is allowed to continue operating; however, if the expected event is not detected during the ready window, the malfunction detection system generates a stop signal to shut down the industrial machine, typically either immediately or at the conclusion of the current machine cycle, depending on the nature of the malfunction. It will also be appreciated that inasmuch as the cyclic events which are being monitored are expected to take place at a known time and last for a known duration during each cycle of the machine, the proper operation of the system's cyclic sensors can be continuously verified by the malfunction detection system, simply by checking to see that a particular cyclic sensor changes state only at the expected time.

"Non-cyclic" events, on the other hand, are those events which do not necessarily occur in each cycle of the industrial machine's operation. For example, in the case of a power press, examples of non-cyclic events might be the occurrence of stock buckling, or the occurrence of a full parts hopper. Such events typically call for shutting down operation of the press, and can be monitored by a variety of sensors which watch for the occurrence of the undesired event. So long as the sensors do not detect the occurrence of the undesired event, the industrial machine is permitted to continue operating; however, if the occurrence of the undesired event is detected, the malfunction detection system generates a stop signal to shut down the industrial machine, either immediately upon the detection of the undesired condition or at the conclusion of the current machine cycle, depending upon the nature of the malfunction. It will also be appreciated that inasmuch as the sensors used to detect non-cyclic events change state only upon the occurrence of undesired events, and since these undesired events typically occur at unpredictable times, the proper operation of the system's non-cyclic sensors cannot be continuously verified by the malfunction detection system in a manner analogous to that of the cyclic sensors as described above.

A third type of event may occur in the course of operating an industrial machine which is neither cyclic nor non-cyclic. Such an event may be referred to as an "intermittent" event, and it is incapable of being properly monitored by either traditional cyclic or traditional non-cyclic sensors. More particularly, intermittent events are those events which need not necessarily occur within each operating cycle of a properly functioning machine, but which must definitely occur at some point within a specified maximum number of machine cycles, as measured from the occurrence of the next preceding one of such intermittent events.

For example, in the case of a power press, an example of an intermittent event might be the proper ejection of waste stock (e.g. "slugs") which can sometimes temporarily collect within the die before falling free. More specifically, in many die designs the waste slugs are intended to sequentially enter a channel which extends between the punching surface of the die and bottom surface of the die, to thereafter fall free of the die. Such slugs may fall free of the die immediately upon being punched from the stock, or several of them may remain within the die (e.g. due to friction with the walls of the channel) before falling free. However, if too many slugs should collect within the die before they are ejected by gravity, perhaps because one of the slugs is bent or otherwise stuck in the die, the slugs may overflow into the adjacent tooling so as to cause a machine jam, or tooling damage, etc.

Thus it will be appreciated that if, for example, the die's channel has a maximum capacity of six slugs, the power press could operate safely for up to six cycles without expelling a slug. Thereafter, however, at least one slug would have to be expelled during the seventh cycle in order to make room at the upper end of the channel for the seventh slug.

If slug expulsion followed a consistent "one slug per cycle" rule, a cyclic sensor could be used to verify that the slugs were being properly ejected from the die and not accumulating in the channel. Unfortunately, however, the slugs do not tend to consistently fall clear of the die with each cycle; instead, they tend to accumulate into multi-slug stacks in the channel until some event (e.g. the accumulating weight of the upper slugs) clears the multi-slug stack as a unit. Using the foregoing example of a channel having a maximum capacity of six slugs, it will be seen that once the accumulated slugs have been cleared, the machine could again operate for up to six cycles prior to the absolute need to once again expel the slugs accumulating in the channel.

Since the slugs do not consistently follow a "one slug per cycle" expulsion rule, ordinary cyclic sensors cannot be used to monitor slug expulsions. As a result, some malfunction detection systems have used non-cyclic sensors, placed within the tooling itself, to monitor a die for the presence of too many accumulated slugs within the channel. Unfortunately, however, this arrangement tends to be an expensive and complex solution to the problem of slug accumulation.

OBJECTS AND SUMMARY OF THE INVENTION

Accordingly, one object of the present invention is to provide a malfunction detection system for monitoring intermittently occurring events during the operation of an industrial machine, and for generating a stop signal for stopping the machine in the event that no such event is detected within a preselected number of cycles following the next preceding event.

Another object of the present invention is to provide a malfunction detection system for power presses, wherein the malfunction detection system is capable of monitoring slug expulsion from a die and preventing an excessive number of slugs from accumulating in the die before shutting down the power press.

Still another object of the present invention is to provide a malfunction detection system for monitoring intermittent events which is low in cost and reliable in operation.

These and other objects are achieved through the present invention, which comprises a novel malfunction detection system for use with an associated industrial machine, wherein the malfunction detection system comprises sensor means for detecting the occurrence of a preselected event during the operation of the industrial machine; counter means for counting successive cycles of the industrial machine; reset signal generating means connected to the sensor means and to the counter means for conveying a reset signal to the counter means whenever the occurrence of the preselected event is detected by sensor means; and machine stop signal generating means connected to the counter means and to the industrial machine's controller for sending a machine stop signal to the industrial machine's controller as soon as the counter means reaches a preselected count.

In operation, the counter means is first set to a starting value corresponding to the maximum number of machine cycles which will be permitted to occur between occurrences of the intermittently occurring events which are being monitored by the malfunction detection system. Once this has been done, the industrial machine is started. Thereafter, during the appropriate ready window for each cycle of the machine, the malfunction detection system continuously polls its sensor means to see if the watched-for event has occurred; if it has, the reset signal generating means immediately sends a reset signal to the counter means so as to reset the counter means to its original starting value. At the end of the appropriate ready window for each machine cycle, the malfunction detection system checks the current value of the counter means; if the current value of the counter means is not equal to zero, the counter means is decremented by one and the industrial machine moves on to its next operation; if, however, the current value of the counter means is equal to zero, the machine stop signal generating means sends a stop signal to the industrial machine's controller so as to shut down the industrial machine, either immediately or at the conclusion of the current machine cycle, as desired. Thus, so long as the sensor means detects the watched-for event within a predetermined maximum number of machine cycles from the last such detected event, the machine will be allowed to continue operating. However, if the number of machine cycles between detected events exceeds a preselected maximum number of machine cycles, the malfunction detection system will generate a machine stop signal to stop operation of the industrial machine.

BRIEF DESCRIPTION OF THE DRAWINGS

These and other objects and features of the present invention will be more fully disclosed or rendered obvious by the following detailed description of the invention, which is to be considered together with the drawings wherein like numbers refer to like parts and further wherein.

DETAILED DESCRIPTION OF THE INVENTION

Figure 1:
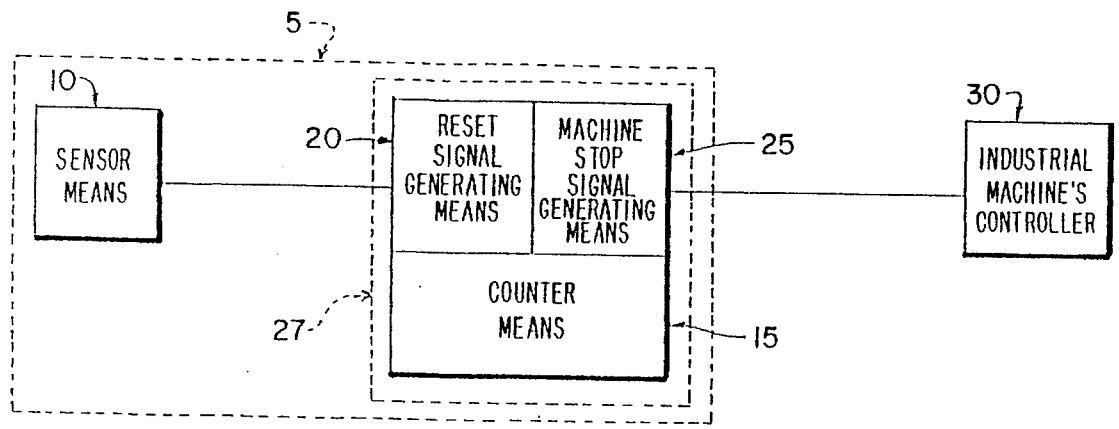
FIG. 1 is a block diagram showing the various elements of a malfunction detection system formed in accordance with the present invention, and their interrelationship with one other and with the industrial machine's controller.

Referring now to the drawings, and particularly to FIG. 1, the present invention generally comprises a novel malfunction detection system 5 for use with an associated industrial machine, wherein the malfunction detection system comprises sensor means 10 for detecting the occurrence of a preselected event during the operation of the industrial machine; counter means 15 for counting successive cycles of the industrial machine to which the malfunction detection system 5 is attached; reset signal generating means 20 connected to sensor means 10 and counter means 15 for resetting counter means 15 whenever the sensor means 10 detects the occurrence of the watched-for event; and machine stop signal generating means 25 connected to counter means 15 and the industrial machine's controller 30 for sending a machine stop signal to controller 30 as soon as counter means 15 reaches a preselected count. Counter means 15, reset signal generating means 20 and machine stop signal generating means 25 together comprise the malfunction detector's logic means subassembly 27, and may or may not be disposed in a single housing or box.

More particularly, sensor means 10 comprises at least one sensor of any convenient type suitable for detecting the event which is to be watched for by the malfunction detection system 5. Hence, the at least one sensor of sensor means 10 could be of an electrical, electro-mechanical, optical, impact or proximity type of the sort well known in the art, or the at least one sensor could be of some other suitable type, depending upon the particular application involved. The at least one sensor of sensor means 10 is located adjacent to the industrial machine so as to permit the at least one sensor to monitor for the occurrence of the preselected event. Sensor means 10 is connected to the reset signal generating means 20, whereby sensor means 10 can advise the reset signal generating means 20 whenever the watched-for event has occurred.

Counter means 15 comprises a counter device for counting successive cycles of the industrial machine to which the malfunction detection system 5 is attached. Such devices are well known in the art. The particular counter device chosen could be of any convenient type suitable for use with the industrial machine involved. Thus, the counter device of counter means 15 could be electrical or mechanical, depending on the application involved. In fact, industrial machines of the sort involved with this invention, and/or existing malfunction detection systems to be modified so as to incorporate this invention, typically already include various counter elements, and it is anticipated that counter means 15 will utilize one or more of these elements in providing the function of counter means 15. In fact, it is anticipated that the associated industrial machine and/or existing malfunction detection system will already comprise substantially all of the hardware needed to form counter means 15, so that counter means 15 can be implemented using such hardware and appropriate software.

Reset signal generating means 20 may also be of any well known type suitable for generating a reset signal to reset counter means 15 whenever the sensor means 10 advises the reset signal generating means 20 that the watched-for event has occurred and, to that end, reset signal generating means 20 is connected to both sensor means 10 and to counter means 15. Again, it is anticipated that industrial machines of the sort involved with this invention, and/or existing malfunction detection systems to be modified so as to incorporate this invention, will already comprise substantially all of the hardware needed to form reset signal generating means 20, so that reset signal generating means 20 can be implemented using such hardware and appropriate software.

Machine stop signal generating means 25 may also be of any well known type suitable for generating a machine stop signal when the counter means 15 reaches a preselected count and conveying that stop signal to the industrial machine's controller 30 so as to shut down the industrial machine. To that end, machine stop signal generating means 25 is connected to both counter means 15 and industrial machine controller 30. Again, it is anticipated that industrial machines of the sort involved with this invention, and/or existing malfunction detection systems to be modified so as to incorporate this invention, will already comprise substantially all of the hardware needed to form machine stop signal generating means 25, so that machine stop signal generating means 25 can be implemented using such hardware and appropriate software.

Figure 2:
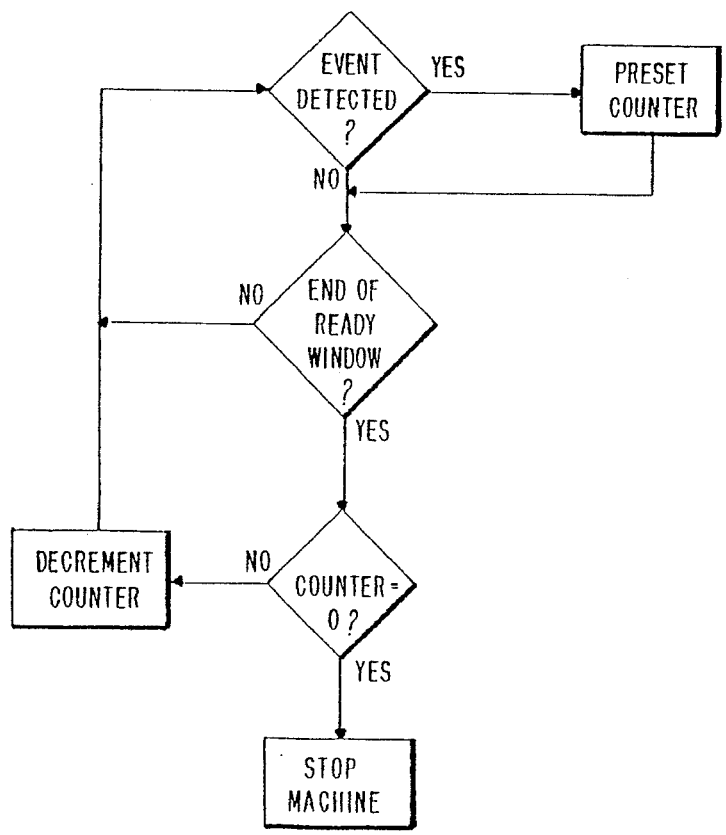
FIG. 2 is a flow chart showing the operation of a preferred embodiment of the present invention.

Referring now to FIG. 2, there is shown a flow chart which illustrates the operation of the malfunction detection system 5 of the present invention. The counter means 15 is initially preset to a level which reflects the maximum number of machine cycles which are to be permitted between occurrences of the watched-for event, and counter means 15 is then activated so as to count off successive machine cycles. While the industrial machine is operating, sensor means 10 watches for the occurrence of the preselected event during the appropriate ready window for each cycle of the industrial machine. If the preselected event is detected by sensor means 10, the counter means 15 is immediately reset by reset signal generating means 20 so that the value in the counter means returns to its starting level. If, however, the end of the appropriate ready window for a machine cycle is reached without the preselected event having been detected by sensor means 10, the current value of the counter means 15 is then checked. If the current value of the counter means 15 is zero, the machine stop generating means 25 sends a stop signal to the industrial machine's controller 30 so as to shut down the industrial machine, either immediately or at the conclusion of the current machine cycle, as desired. If the current value of the counter means 15 is not zero, the counter means 15 is decremented by one before the industrial machine begins its next cycle. In this way malfunction detection system 5 can ensure that the industrial machine will never cycle through more than some preselected maximum number of machine cycles between occurrences of some watched-for event.

Malfunction detection system 5 can be utilized to detect intermittently occurring events in a wide variety of different industrial machines. For example, malfunction detection system 5 could be used to monitor slug ejection from a punch press. In order to facilitate a further understanding of the present invention, a malfunction detection system for monitoring slug ejection from a punch press will now be described. At the same time it should be appreciated, however, that this particular embodiment of the invention is being provided solely in an illustrative sense to help explain the various features and advantages of the present invention, and should not be construed as limiting the present invention in any way. It should be understood that the invention is equally applicable to a wide range of other machines and/or other contexts of use.

Figure 3:
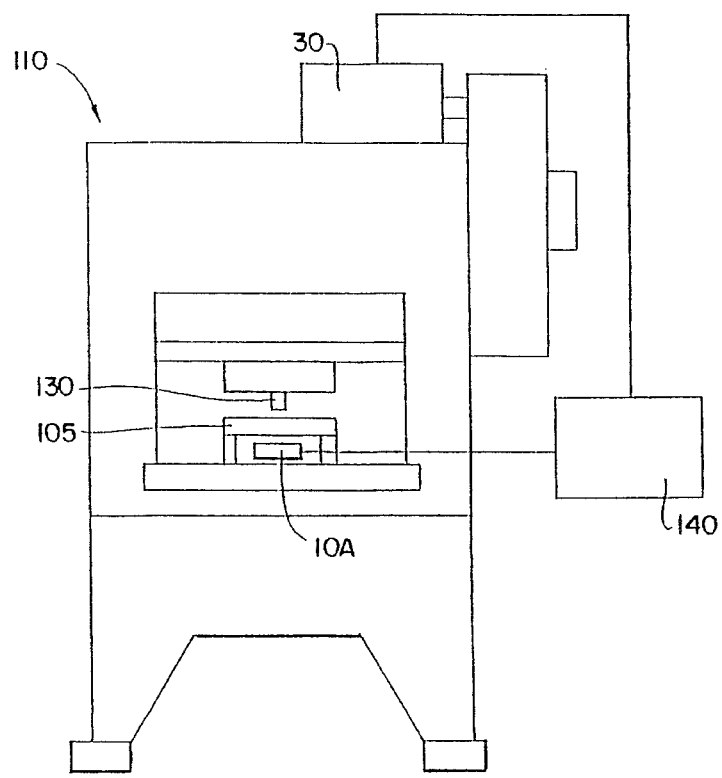
FIG. 3 is a side view of a punch press incorporating the present invention.
Figure 4:
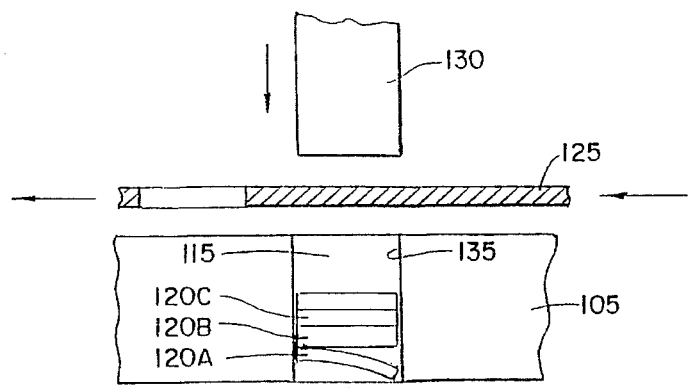
FIG. 4 is a side view, in section, showing a piece of stock passing through a punch press, wherein the punch press includes a slug-detecting sensor in accordance with the present invention.

Looking next at FIGS. 3 and 4, it is common, as discussed above, for the die 105 of a punch press 110 to include a vertical channel 115 into which slugs 120A, 120B, 120C, etc. are punched from the stock 125 by a punch 130. These slugs 120A, 120B, 120C, etc. may fall all the way through channel 115 immediately after the slugs are separated from stock 125 by punch 130. Not infrequently, however, one or more of the slugs 120A, 120B, 120C, etc. may stick in channel 115 by virtue of some normal frictional engagement with the side walls 135 of channel 115, or by virtue of the fact that one or more of the slugs may be bent or twisted (see, for example, slug 120A in FIG. 4). Subsequent slugs can thereafter also accumulate in channel 115, in the manner shown in FIG. 4. Typically any accumulating slugs will thereafter clear themselves as a group, falling out of the channel all at once. However, if the accumulating slugs do not clear themselves out of the channel quickly enough, they can accumulate to the point where they start to overflow the top of channel 115 and spill over into the adjoining areas of die 105. This can cause serious die and/or machine damage. Accordingly, in the context of a punch press such as that shown in FIGS. 3 and 4, it is important to ensure that the slugs do not accumulate in channel 115 to the point where they may start to overflow the top of the channel and spill over into the adjoining tooling.

For example, if the capacity of channel 115 is six slugs stacked one on top of the other, at least one slug must be expelled from the die within six press cycles from the point at which slugs began to accumulate in the channel. As a practical matter, however, it has been observed that the slugs tend to fall free from channel 115 in a stack, so as to completely clear the channel all at once. Thus, so long as any accumulated slugs clear from channel 115 as a stack within some maximum number of machine cycles from the point of the previous slug clearing, one can always be certain that the slugs will not accumulate in channel 115 to the point where they will overflow the top of the channel and damage the surrounding tooling. Thus, since such slug clearing is essentially an intermittent event of the sort described above, it will be seen that the malfunction detection system 5 described above can provide important benefits when used in association with a punch press 110 such as that shown in FIGS. 3 and 4.

Figure 5:
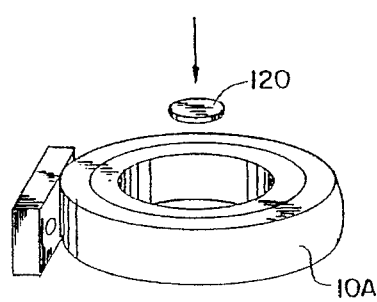
FIG. 5 is a perspective view showing further details of the slug-detecting sensor of FIG. 4.

Malfunction detection system 5 is conveniently and easily attached to punch press 110. More particularly, and still looking now at FIGS. 3 and 4, the system's sensor means 10 is located immediately below the lower end of channel 115 so that it can detect the slugs as they fall out of the channel. In the case of this particular application, the sensor means 10 might take the form of a ring sensor 10A (FIGS. 3–5) of the sort adapted to register the passage of a slug 120 therethrough. Such ring sensors are well known in the art. Counter means 15, reset signal generating means 20 and machine stop signal generating means 25, together comprising the malfunction detector's logic means subassembly 27, are located adjacent to the press 110, for example on a board or in a box generally indicated at 140 in FIG. 3, with reset signal generating means 20 being connected to sensor means 10 and to counter means 15 in the manner previously described, and with machine stop signal generating means 25 being connected to counter means 15 and to the press controller 30 as previously described. In addition to the foregoing, counter means 15 are connected to the press, in ways well known in the art, so that the counter means can recognize and count successive cycles of the power press.

In use, malfunction detection system 5 first has its counter means 15 preset to some level which reflects the maximum number of press cycles which are to be permitted between slug ejections. For example, where channel 115 has a capacity of six slugs before it overflows, one might set the counter means 15 to six, so that no more than six press cycles can take place between slug ejections. In practice, one might wish to set the counter means 15 several measures lower, e.g. to four, to provide an adequate safety measure.

Malfunction detection system 5 then operates according to the flow chart shown in FIG. 2. More specifically, each time sensor means 10A detects the passage of slugs out of the bottom of channel 115, reset signal generating means 20 resets counter means 15 back to its original starting value. However, if the appropriate ready window of a press cycle ends without sensor means 10 detecting the ejection of slugs from channel 115, counter means 15 is checked to see if it has a current value of zero. If counter means 15 has a current value of zero, counter means 15 reports this fact to machine stop signal generating means 25, and machine stop signal generating means 25 sends a stop signal to machine controller 30 so as to safely shut down the press. On the other hand, if the counter means 15 does not have a current value of zero at the end of the appropriate ready window for a press cycle, the counter means 15 has its current value decremented by one and the press moves on to its next operation. In this manner, malfunction detection system 5 can be used to ensure that power press 110 will never cycle through more than some maximum number of press cycles between slug ejections. This will in turn ensure that slugs 120 will not accumulate in channel 115 to the point where they may overflow the top of channel 115 and damage the surrounding tooling.

Numerous modifications, variations, changes and alterations of the present invention will occur to those skilled in the art in view of the foregoing detailed description of the invention.

Thus, for example, one might utilize an incremental counter arrangement in place of the decremental counter arrangement previously described. In this event, one would preset the counter means 15 so that it has a value of zero both initially and whenever it is reset via the reset signal generating means 20; and the machine stop signal generating means 25 would be programmed to send its stop signal to press controller 30 when counter means 15 has reached some preselected value (rather than a value of zero in the decremental counter embodiment previously discussed).

These and other changes of their type are considered to be obvious to a person skilled in the art and within the scope of the present invention.

What is claimed is:

1. A system for monitoring the operation of an industrial machine of the type (i) comprising a machine controller adapted to stop said industrial machine in response to a machine stop signal, (ii) characterized by repetitive machine cycle operation and the intermittent occurrence of events of a predetermined type, and (iii) requiring the occurrence of one of said predetermined type of events within a preselected number greater than one of said machine cycles following the next preceding one of said predetermined type of events for continuous and safe machine operation;

said system comprising:

sensor means for detecting the occurrence of said predetermined type of events during the operation of said industrial machine, said sensor means being adapted to be positioned relative to said industrial machine in sensing relation to the expected location of said predetermined type of events and including means for generating a signal in response to each detection of a predetermined type of event;

counter means for counting said repetitive machine cycles of said industrial machine, said counter means being associated with said industrial machine and being resettable to a first preselected count in response to a reset signal;

reset signal generating means connected to said sensor means and to said counter means, said reset signal generating means being responsive to said signals generated by said sensor means and being adapted to convey a reset signal to said counter means whenever the occurrence of one of said predetermined type of events is detected by said sensor means; and machine stop signal generating means connected to said counter means and to said machine controller, said machine stop signal generating means being adapted to transmit a machine stop signal to said machine controller whenever said counter means reaches a second preselected count.

2. A system according to claim 1 wherein said counter means comprises a decremental counter which is adapted to be decremented by one for each successive cycle of the industrial machine, and further wherein said reset signal generating means conveys a reset signal to said counter means so as to cause said decremental counter to be reset to a predetermined value greater than zero whenever the occurrence of one of said intermittent events is detected by said sensor means, and further wherein said machine stop signal generating means sends a machine stop signal to the industrial machine's controller when the decremental counter has a value of zero.

3. A system according to claim 1 wherein said counter means comprises an incremental counter which is adapted to be incremented by One for each successive cycle of the industrial machine, and further wherein said reset signal generating means conveys a reset signal to said counter means so as to cause said incremental counter to be reset to zero whenever the occurrence of one of said intermittent events is detected by said sensor means, and further wherein said machine stop signal generating means sends a machine stop signal to the industrial machine's controller when the incremental counter reaches a preselected value greater than zero.

4. A system according to claim 1 wherein said sensor means is selected from the group consisting of electromechanical sensors, impact sensors, proximity sensors and optical sensors.

5. A system according to claim 1 wherein said industrial machine is a punch press of the type comprising a die and a punch, said punch being adapted for intermittent association with said die for sequentially forming punched out portions from a piece of stock material, wherein said die includes a channel having an entrance, an exit and the capacity to contain a preselected maximum number of said punched out portions, said channel being adapted to receive said sequentially punched out portions of said stock material at said entrance during the operation of said industrial machine; wherein said predetermined type of event comprises the ejection of said punched out portions from said channel exit; and further wherein said sensor means is located adjacent said channel exit so that said punched out portions of said stock material leaving said die through said channel exit are detected by said sensor means.

6. A method for monitoring the operation of an industrial machine of the type (i) comprising a machine controller adapted to stop said industrial machine in response to a machine stop signal, (ii) characterized by repetitive machine cycle operation and the intermittent occurrence of events of a predetermined type, and (iii) requiring the occurrence of one of said predetermined type of events within a preselected number greater than one of said machine cycles following the next preceding one of said predetermined type of events for continuous and safe machine operation;

said method comprising the steps of:

(1) providing a system comprising:

sensor means for detecting the occurrence of said predetermined type of events during the operation of said industrial machine, said sensor means being positioned relative to said industrial machine in sensing relation to the expected location of said predetermined type of events and including means for generating a signal in response to each detection of a predetermined type of event;

counter means for counting said repetitive machine cycles of said industrial machine, said counter means being associated with said industrial machine and being resettable to a first preselected count in response to a reset signal;

reset signal generating means connected to said sensor means and to said counter means, said reset signal generating means being responsive to said signals generated by said sensor means and being adapted to convey a reset signal to said counter means whenever the occurrence of one of said predetermined type of events is detected by said sensor means; and machine stop signal generating means connected to said counter means and to said machine controller, said machine stop signal generating means being adapted to transmit a machine stop signal to said machine controller whenever said counter means reaches a second preselected count;

(2) starting said industrial machine and said counter means; and (3) operating said system in conjunction with said industrial machine such that:

(a) said reset signal generator will convey a reset signal to said counter means whenever said sensor means detects the occurrence of one of said predetermined type of events; and (b) said machine stop signal generating means will convey a stop signal to said machine controller so as to stop said industrial machine when said counter reaches said second preselected count.

7. A system for monitoring the operation of an industrial machine of the type (i) comprising a machine controller adapted to stop said industrial machine in response to a machine stop signal, (ii) characterized by repetitive machine cycle operation and the intermittent occurrence of events of a predetermined type, and (iii) requiring the occurrence of one of said predetermined type of events within a preselected number greater than one of said machine cycles following the next preceding one of said predetermined type of events for continuous and safe machine operation;

said system comprising:

sensor means for detecting the occurrence of said predetermined type of events during the operation of said industrial machine, said sensor means being adapted to be positioned relative to said industrial machine in sensing relation to the expected location of said predetermined type of events and including means for generating a signal in response to each detection of a predetermined type of event;

counter means for counting said repetitive machine cycles of said industrial machine, said counter means being associated with said industrial machine and being resettable to a first preselected count in response to a reset signal;

reset signal generating means connected to said sensor means and to said counter means, said reset signal generating means being responsive to said signals generated by said sensor means and being adapted to convey a reset signal to said counter means whenever the occurrence of one of said predetermined type of events is detected by said sensor means; and machine stop signal generating means connected to said counter means and to said machine controller, said machine stop signal generating means being adapted to transmit a machine stop signal to said machine controller whenever said counter means reaches a second preselected count;

wherein said industrial machine is a punch press of the type comprising a die and a punch, said punch being adapted for intermittent association with said die for sequentially forming punched out portions from a piece of stock material, wherein said die includes a channel having an entrance, an exit and the capacity to contain a preselected maximum number of said punched out portions, said channel being adapted to receive said sequentially punched out portions of said stock material at said entrance during the operation of said industrial machine; wherein said predetermined type of event comprises the ejection of said punched out portions from said channel exit; and further wherein said sensor means is located adjacent said channel exit so that said punched out portions of said stock material leaving said die through said channel exit are detected by said sensor means.

* * * * *